United States Patent [19]
Wolfston, Jr.

[11] Patent Number: 5,815,155
[45] Date of Patent: Sep. 29, 1998

[54] METHOD AND APPARATUS FOR NAVIGATING AN INFORMATION HIERARCHY

[75] Inventor: James H. Wolfston, Jr., Portland, Oreg.

[73] Assignee: Universal Algorithms Incorporated, Portland, Oreg.

[21] Appl. No.: 700,567

[22] Filed: Aug. 7, 1996

Related U.S. Application Data

[60] Provisional application No. 60/004,347 Sep. 27, 1995.

[51] Int. Cl.⁶ .................................................. G06F 3/00
[52] U.S. Cl. ............................................................. 345/357
[58] Field of Search .......................... 395/357; 345/333, 345/334, 339, 348, 349, 353, 354, 356, 357

[56] References Cited

U.S. PATENT DOCUMENTS

| | | | |
|---|---|---|---|
| 5,241,671 | 8/1993 | Reed et al. | 345/357 X |
| 5,297,253 | 3/1994 | Meisel | 345/357 |
| 5,317,511 | 5/1994 | Jacobson | 345/357 |
| 5,708,787 | 1/1998 | Nakano et al. | 345/352 |

*Primary Examiner*—A. Katbas
*Attorney, Agent, or Firm*—Stoel Rives LLP

[57] ABSTRACT

A system of user navigation through large computer programs with many screens provides the user with a set of clickable actuators that indicate the path taken to the user's current position in the hierarchy and that provide an intuitive method for returning to any previous level. The clickable actuators form a coherent image that is consistent with an overall theme or metaphor related to the subject matter of the information presented.

19 Claims, 11 Drawing Sheets

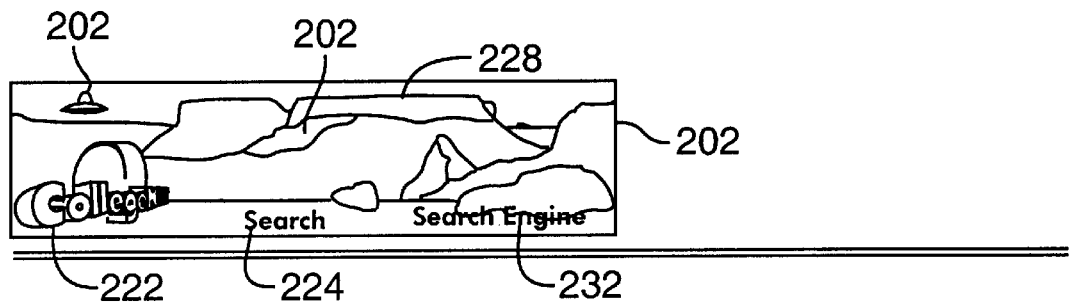

The CollegeNET Search Engine

State: /²³⁴                                             230

AL AK AZ AR CA CO CT DE FL GA HI

ID IL IN IA KS KY LA ME MD MA MI

MN MS MO MT NE NV NH NJ NM NY NC

ND OH OK OR PA RI SC SD TN TX UT

VT VA WA WV WI WY WASHINGTON, D.C.

Enrollment  —234
from: to:

Tuition  —234
from: to:

Search by name: /²³⁴
Enter the name of the school you are interested in.
Substrings are OK (such as column for Columbia University.)

Search by majors offered: /²³⁴
Enter the name of the major you are interested in.
Substrings are OK (such as comp for Computer Science.)

Start Search:

Reset Button:

SEARCH CRITERIA
States selected: OR
Enrollment: All
Tuition: All       ← 244
School Name: Reed                    240
Majors: All

1 schools matched your criteria.
(Only the first 200 schools matching your criteria will be listed.)

Reed College
3203 S.E. Woodstock Boulevard  ← 246
Portland, OR 97202
503 777-7511
Full time UG enroll: 1203
In-State Tuition: $20610
Out-of-State Tuition: $20610

METHOD AND APPARATUS FOR NAVIGATING AN INFORMATION HIERARCHY

TECHNICAL FIELD OF THE INVENTION

The present invention relates to an ergonomic array of actuators for use in the human control of a device. More specifically it is related to an array of congruent images each of which may be selected to cause the operations of a computer program to shift to a desired location and which furthermore may be juxtaposed to form a coherent, engaging integrated image. This image may act as a location indicator and present a further choice of potential destinations for the user.

BACKGROUND OF THE INVENTION

The advent of inexpensive computing power is revolutionizing our society. One of the major impediments to integrating computers into the lives of ordinary people is the complexity of human-computer interfaces. For example, in discussing the next paradigm shift in computer use in communications, Alan Kay, considered by many to be the "Father of the Personal Computer," states: "The only stumbling place for this onrushing braver new world is that all of its marvels will be very difficult to communicate with, because, as always, the user interface design that could make it all simple lags far, far behind." Alan Kay, "User Interface: A Personal View," The Art of Human-Computer Interface Design, p. 204 (Brenda Laurel ed., 1991).

A new field of study, human-computer interaction, has emerged to address problems in the design of the human-computer interface. The new field draws ideas from psychology, computer science, information science, philosophy, sociology, and education. Aspects of human-computer interactions are discussed, for example, in G. Marchionni, *Information Seeking in Electronic Environments*, Cambridge University Press (1995).

Although the problems of human-computer interfaces have been extensively studied, unsolved problems remain. "Interface problems are often obvious. Solutions are less obvious. It may be difficult to find a solution that solves a problem without creating new problems. Even then, a separate solution for every problem would result in an interface of such complexity that it would be unusable. What is really needed is a solution that elegantly solves a range of problems. Such solutions are exceptionally difficult to find." Thomas D. Erickson, "Creativity and Design Introduction," The Art of Human-Computer Interface Design, p. 4 (Brenda Laurel ed., 1991).

"There are three sorts of reasons why interface design is difficult. First, quite simply, it's hard to come up with good solutions. Second, there are so many competing desiderata involved in interface problems that any solution is bound to be a compromise. The problem here is one of evaluation: how do designers figure out which compromises will fly and which are to be avoided? The third reason for the difficulty of interface design is that it's interdisciplinary and highly political." Id., at 4–5. Computer-human interfaces are used in carrying out computer-implemented process, such as the process of obtaining or providing information, goods, or services.

One area in which computer-human interfaces need improvement is in the accessing information in databases. Computer networks have made vast quantities of information readily available to anyone owning a personal computer and a modem. Although broadly accessible computer databases, like any mass-distributed consumer product, should be attractive as well as easy and fun to use, it is often difficult for the average computer user, who is not highly trained in computer science, to find needed information. Even after locating a source database containing the sought-after information, navigating through a hierarchy of screen displays to locate the sought-after information can be difficult for most computer users.

The task of providing computer users with an engaging, easily understood database navigation methodology has proven to be a difficult challenge for software designers. If the designer chooses to present a written menu to the user, it is necessary to choose words that easily and accurately convey the sense of the choice presented. Furthermore, such a display lacks the color and graphic qualities that attract and maintain a user's attention. If images are used, however, it is all too easy to overwhelm the user by cluttering the screen with a discordant jumble of imagery. The problem is further complicated by the great number of different display screens used to present or request information at various levels of a large hierarchy of screen displays.

Besides providing the user with engaging, easy-to-use option designators, it is also important to provide the user some indication of his location within the system as he moves through various screens. Some systems do this with a "path" notation so that the user may view and elect to return to any step in the path of screen displays the user has traveled to arrive at the current location. Unfortunately, the path notation may become long and cumbersome and may even repeat itself if the user has taken a circuitous route to the current destination. Furthermore, the same problem of presentation occurs. It is a challenge to find a system for displaying the user's location within the system in a manner that is easy to grasp and engaging to the user.

The screen displays available in some large computer programs may be thought of as being organized as a hierarchical tree. Each screen display may be thought of as a vertex in the tree. It is a tree in the sense that operations generally start at a first main screen and descend to lower hierarchical levels from there, becoming more and more specific until no greater specificity is possible.

It is a difficult task to make navigating through a vast hierarchy of screen displays associated with a large database easy and engaging. The more choices presented to the user, the more confusing the task becomes. If the user's choices are restricted, however, navigation may become frustratingly slow.

SUMMARY OF THE INVENTION

It is an object of this invention to facilitate navigation through a hierarchy of screen displays to obtain or provide information.

Another object of the invention is to facilitate such navigation by an unsophisticated computer user.

A further object of the present invention is to provide the user of a computer program with an engaging display of options for selecting a path among the various screens of a software package.

Still another object of the invention is to attractively and concisely present to the user a trail of steps taken to arrive at the users present location.

Yet another object of the invention is to provide the user with an engaging and easily understood location indicator that presents further options for movement within the program.

Still another object of the invention is to provide a methodology for facilitating the use of computer-implemented processes.

The present invention comprises a methodology for facilitating a user's navigation through a hierarchy of computer-presented information in the form of screen displays that present or request information. The hierarchy of screen displays accomplishes a computer-implemented process, such as obtaining information from a database or providing information to a service or product provider. Information presented or requested at the top level of the screen display hierarchy is typically the most general information in the system, with the information becoming more specific as one descends the screen display hierarchy. The methodology includes presenting at one level of the hierarchy selectable actuators that identify a current level and higher levels in the hierarchy through which the user has passed to reach the current level and that are operational to return the user to the corresponding levels. The actuators are juxtaposed to form a unitary image that is consistent with an overall theme or metaphor corresponding to the subject matter of the data. The actuators thus function as a mnemonic device recalling the subject matter of the database, while indicating to the user his position in the hierarchy of data. The actuators identify the level they represent and are thematically or metaphorically consistent with one another and with the subject matter to facilitate the users' navigation to different levels of the hierarchy. The methodology may also include user-selectable options for descending to different screen displays at a lower level or for returning to a higher level.

Another aspect of the present invention is the presentation of an engaging location indicator to the user. The use of a congruent and previously known symbol set makes this indicator more engaging. The location indicator differs from a path display in that only information needed to define the user's location within the system is shown. For example, if a user navigates from a lower level to a higher level in the hierarchy, the system no longer displays the actuators representing the lower levels through which the user has passed. The system typically displays actuators for only the current level and higher levels necessary to be traversed to obtain the current level.

Additional objects and advantages of this invention will be apparent from the following detailed description of a preferred embodiment thereof that proceeds with reference to the accompanying drawings.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIGS. 4a–4d show a second preferred embodiment of a computer screen display system according to the present invention.

DETAILED DESCRIPTION OF PREFERRED EMBODIMENTS

Figure 1A:
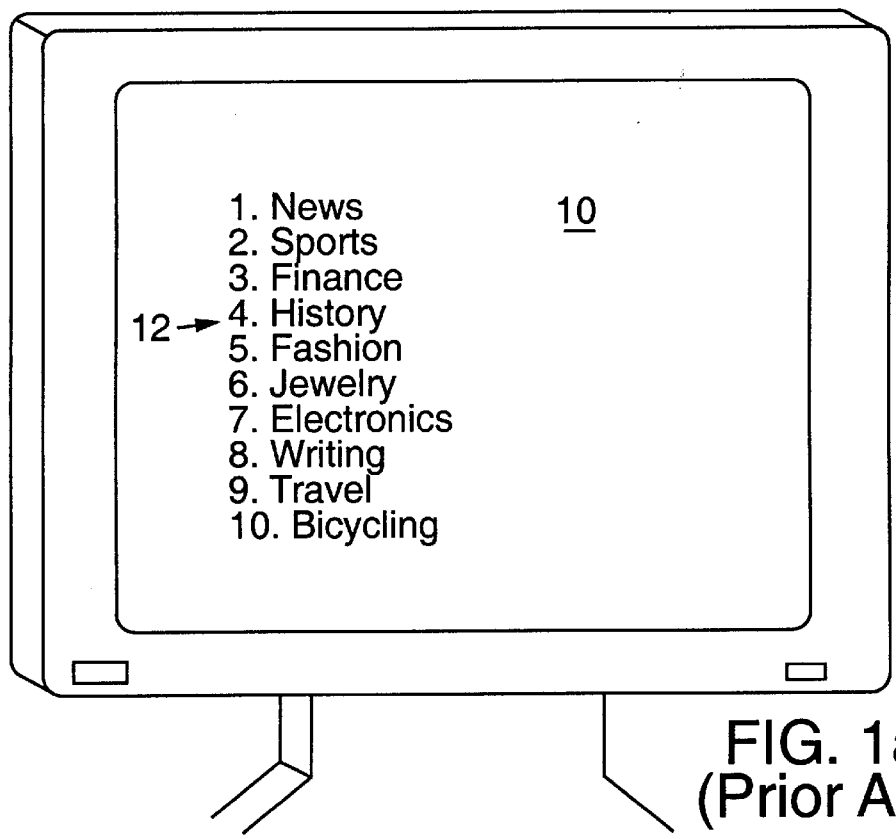
FIG. 1a shows a first prior art computer screen display presenting navigational options to the user.
Figure 1B:
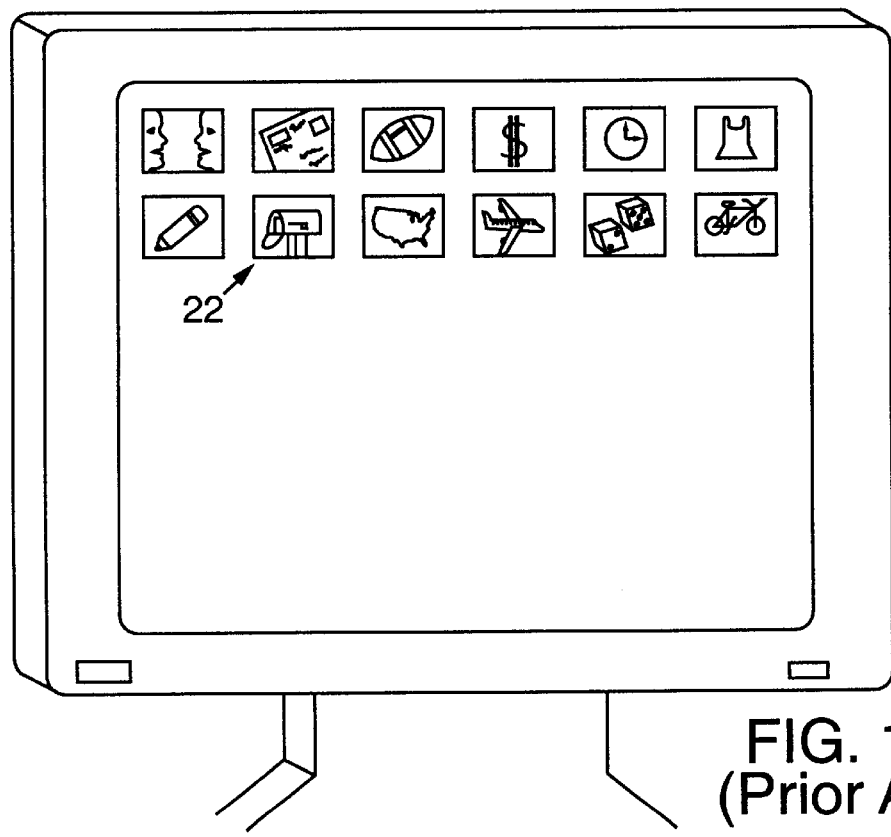
FIG. 1b shows a second prior art computer screen display presenting navigational options to the user.

FIG. 1a shows a prior art example of a screen display 10 used, for example, to navigate at a site on the Internet. A written menu 12 on screen display 10 offers a large selection of choices in written form. A novice user is likely to feel overwhelmed by the nonintuitive, uncorrelated presentation of the menu selections displayed here. In addition, there is nothing engaging about this screen. There is nothing to cause a wary user to want to begin navigating about this Internet site. FIG. 1b shows a typical display 20 from an on-line service. The bar of multiple unrelated icons 22 at the top can be confusing to the average user.

Figure 2A:
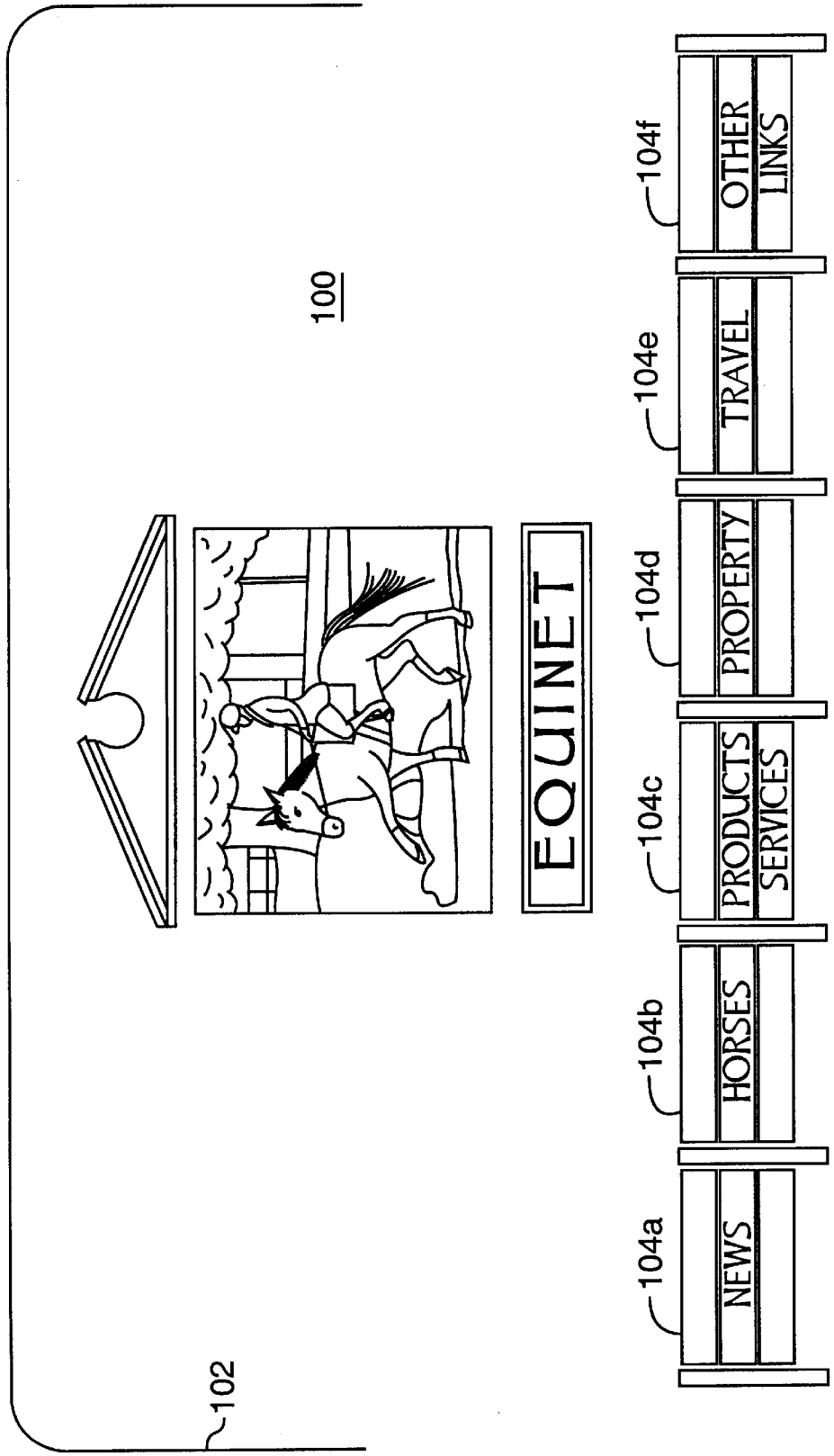
FIGS. 2a–2d show a first preferred embodiment of a computer screen display system according to the present invention.
Figure 2B:
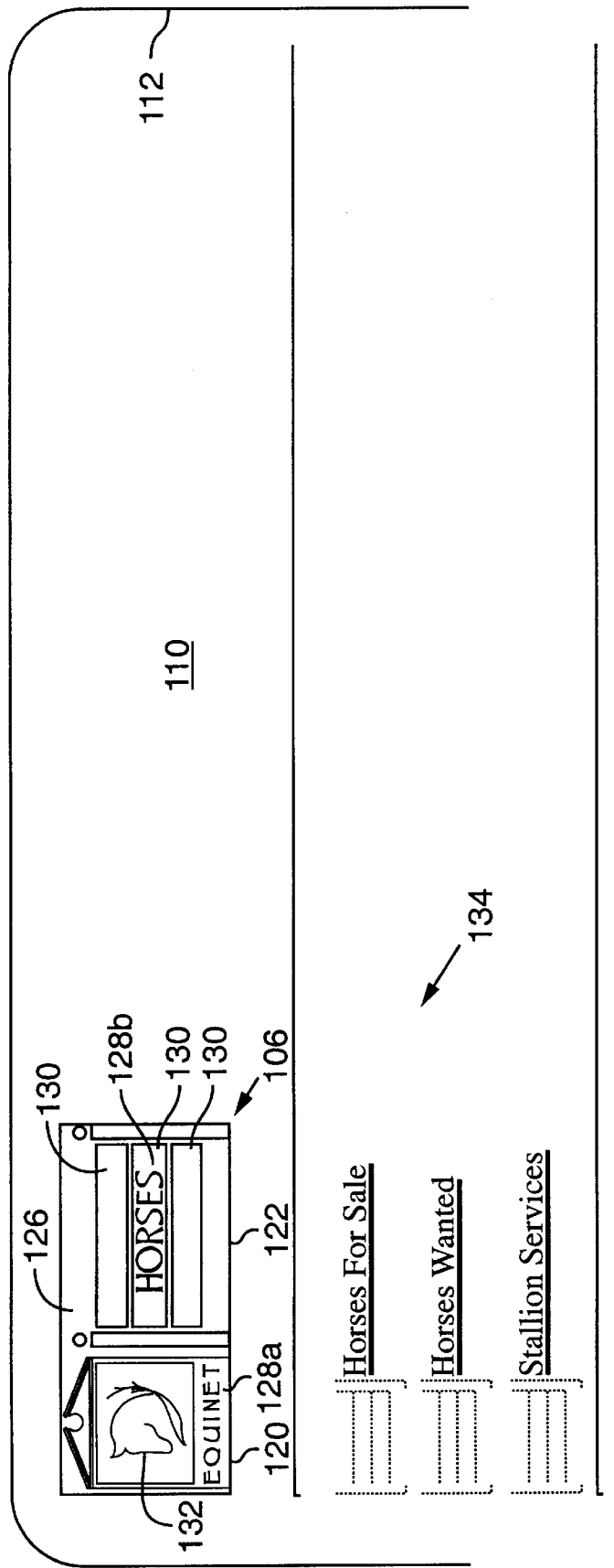

FIGS. 2a–2d show a first preferred embodiment of the present invention as implemented in the Equinet™ service, accessible on the Internet at http://www.equinet.com/. FIGS. 2a–2d show some of the screen displays used in a computer implemented process of locating data in a database related to horses. FIG. 3 shows part of a hierarchy 90 of screen displays and shows the relative position in hierarchy 90 of the screen displays shown in FIGS. 2a–2d. Each of FIGS. 2a–2d shows a screen display at a different level in a hierarchy of screen displays. FIG. 2a shows a first screen display 100 presented on a computer monitor 102. Screen display 100 presents to a user a series of selectable options 104a–104f, which are shown as sections of a fence 106, typical of the type of fence used to corral horses. Fence 106 is thematically consistent with the horse subject matter of the data available in the database. FIG. 2b shows a second screen display 110 on computer monitor 112. Screen display 110 is displayed after a user has selected option 104b labeled "HORSES" from screen display 100 at the top hierarchical level shown in FIG. 2a. Screen display 110 presents information at a hierarchical level one step lower than the information presented in screen display 100. Had the user selected a different one of options 104a–104f, such as option 104d labeled "PROPERTY," from screen display 100, the user would have navigated to a different screen display (not shown) at the same hierarchical level as screen display 110.

FIG. 2b shows clickable actuators 120 and 122 near the top of screen display 110. Clickable actuators 120 and 122 include a background showing a rustic shake wall 126 suggestive of rural environs and identifying labels 128a and 128b, respectively. Clickable actuator 122 also includes fence rails 130, and clickable actuator 120 includes an image of a identification plaque 132 of the type that one would typically find suspended from a fencepost at the entrance to a horse farm. The images of clickable actuators 120 and 122 are thus consistent with each other and with the overall theme of horses and form a unitary image pictorially consistent with the overall theme of horses.

Clickable actuator 120, if selected, will return the user to the primary hierarchical level represented by screen display 100. The leftmost position of actuator 120 indicates that it represents the topmost level. The rightmost position of actuator 122 indicates that it represents the current position in the navigational hierarchy. Label 128b, which comprises the word "HORSES" written across a fence rail 130, shows that the current level is "HORSES." Actuator 122 will rerequest the current level if activated. Actuators 120 and 122 thus represent different hierarchical levels of the computer-presented display screens in the database of information about the subject matter horses.

Screen display 110 also shows a list 134 of available user-selectable options. A user can select "Horses for Sale," "Horses Wanted," or "Stallion Services." Selecting any of these options navigates the user to a different screen display at the next lower hierarchical level. For example, if a user selects "Horses for Sale," a screen display 140, such as that shown in FIG. 2c, is displayed on computer screen 110.

Figure 2C:
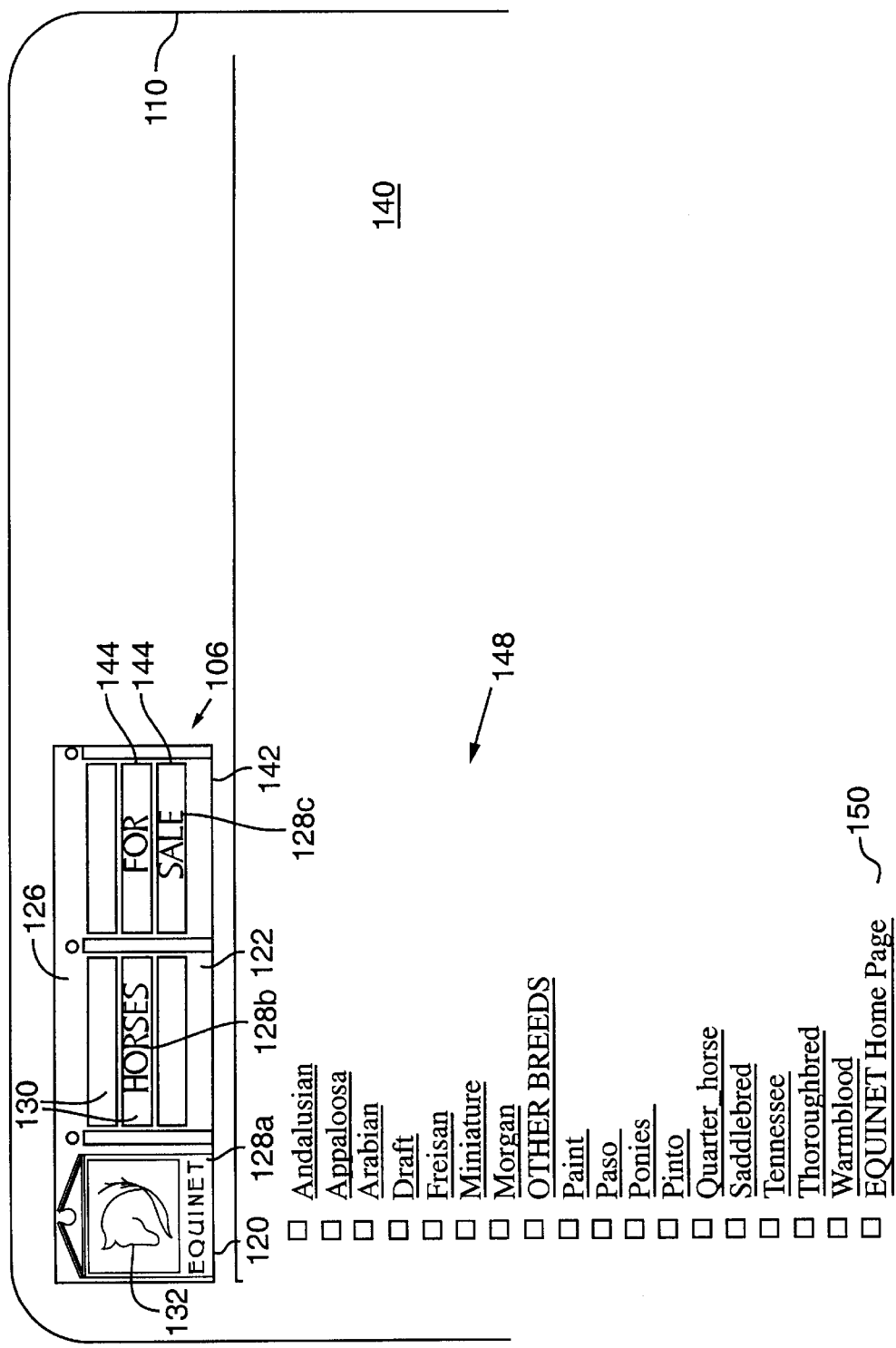
Figure 3:
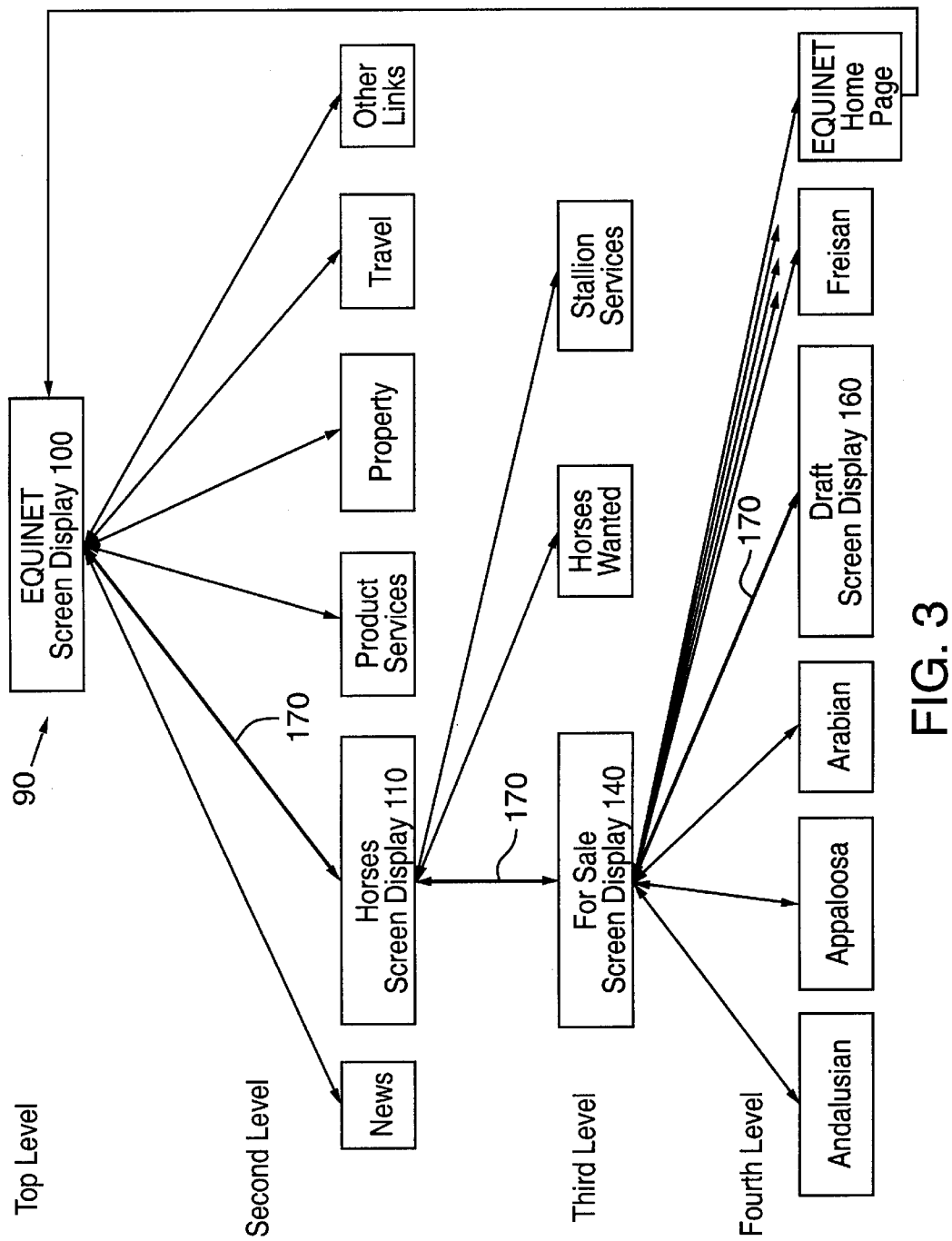
FIG. 3 shows part of the hierarchy of screen displays that includes the screen displays of FIGS. 2a–2d.

FIG. 2c shows on computer screen 110 a screen display 140 at a hierarchical level one step below that of screen 110 of FIG. 2b. FIG. 2c shows three clickable actuators 120, 122, and 142 forming fence 106. The first two clickable actuators 120 and 122 are the same as those displayed in FIG. 2b and, if one is selected, the system will navigate the user to the selected hierarchical level and redisplay the respective display screen 100 or display screen 112. Third clickable actuator 142 represents the current position in the hierarchy, "HORSES FOR SALE," and is identifiable by a label 128c that comprises the words "FOR SALE" written on fence rails 144 in clickable actuator 142. The rustic shake wall 126 in the background and the fence rails 130 and 144 and fence posts in each of the clickable actuators in this embodiment provide a thread of common pictorial subject matter running through the actuators. The hierarchical screen display levels represented by clickable actuators 120, 122, and 142 decrease from left to right.

FIG. 2c also shows a list 148 of types of horses for sale. In response to a user selecting a type of horse from list 148, a screen display at the next lower hierarchical level is presented. List 148 also includes a selectable option 150 that returns the user to screen display 100 at the top level. For example, FIG. 2d shows a typical screen display 160 that is presented when a user selects "DRAFT" horses.

Figure 2D:
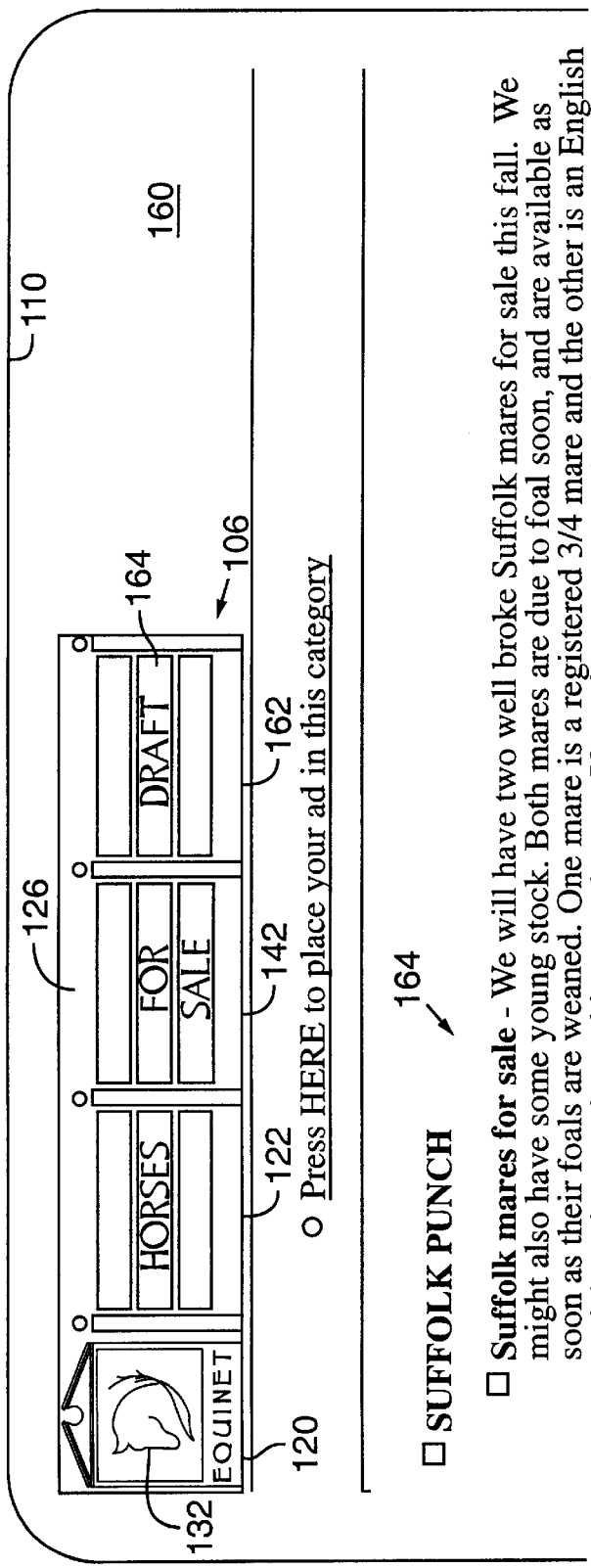

FIG. 2d shows on computer screen 110 screen display 160, which includes four clickable actuators. The first three clickable actuators 122, 124, and 142 are the same as those displayed in FIG. 2c, and if one is selected, it will return the user to the corresponding higher hierarchical level 100, 110, and 140, respectively. The fourth clickable actuator 162 represents a lower level in the hierarchy "Draft Horses for Sale," indicated by the word "DRAFT" written across a fence rail 164. Each of clickable actuators 122, 124, 142, and 162 includes common pictorial subject matter, i.e., fence portions and a background shake wall, consistent with the overall theme of horses. Actuators 122, 124, 142, and 162 together form a unitary image of a fence. The right fence post of each actuator forms the left fence post of a contiguous actuator, and rustic shake wall 126 of each actuator blends into shake wall 126 of neighboring actuators to appear to form a single rustic shake wall 126.

Leftmost actuator 120 represents the top hierarchical level, rightmost actuator 162 represents the present position in the hierarchy, and actuators 122 and 142 represent intermediate levels that are above the current level and through which the user passed in navigating from the top level to the current level. If a user had previously descended to levels below that of screen display 160, no actuator representing such lower level would be presented after the user returns to the level of screen display 160. For example, if a user selects clickable actuator 122 labeled "HORSES" the system would display screen display 110 (FIG. 2b). Clickable actuators 142 and 162, which do not lie between the new current level and the top level, would no longer be displayed, even though they represent screens the user has passed through before arriving at his current position.

Below actuators 122, 124, 142, and 162 is a list 164 of actual draft horses for sale. The user has successfully navigated the database to find a list of draft horses for sale and can contact sellers by telephone or mail. In some embodiments, screen display 160 represents the last level in the hierarchy. In other embodiments, selecting an item from list 164 of draft horses could lead to a screen display at another hierarchical level that contains, for example, an image or additional information about a particular horse or a message screen for contacting the seller.

Each actuator of FIGS. 2a–2d thus provides the user with a consistent pictorial reference to horses, the subject matter of the database. The rightmost actuator in each of the displays of FIGS. 2a–2d provides an intuitively understandable display of the user's current position within hierarchy 90 (FIG. 3). The other actuators of each display show a path 170 from the top level of hierarchy 90 to the current position, progressing to the right from higher to lower levels and provide a means to return to any position along that path. When a user returns to a higher level from a lower level, clickable actuators representing the lower levels through which the user has passed are no longer displayed.

By presenting images thematically or metaphorically consistent with the overall theme of the information in the database, the actuators function as a mnemonic device, keeping the user focused on the subject matter of the computer-presented information and engaging the user's attention.

FIGS. 4a–4d show a second embodiment of the invention as used in the CollegeNET™ computer service, accessible on the Internet at http://www.collegenet.com/. CollegeNET™ provides information about, and admission application processing for, colleges and universities. This embodiment uses a spacecraft metaphor to represent higher education. As shown in FIGS. 4a–4d, as the user descends the hierarchy of screen displays and approaches the sought-after data, the clickable actuators show a spacecraft approaching its destination and nearing the ground. At the bottom level of the hierarchy, in which the search results are presented to the user, the spacecraft is shown as having landed. The mountainous scenes in the background of the separate clickable actuators blend together to form a unitary image of a rugged mountainous region. The actuators have in common the subject matter of the spacecraft and the mountainous background scenery. In this embodiment, the different levels of the hierarchy represent steps in the process of obtaining information about schools that meet particular criteria.

Figure 4A:
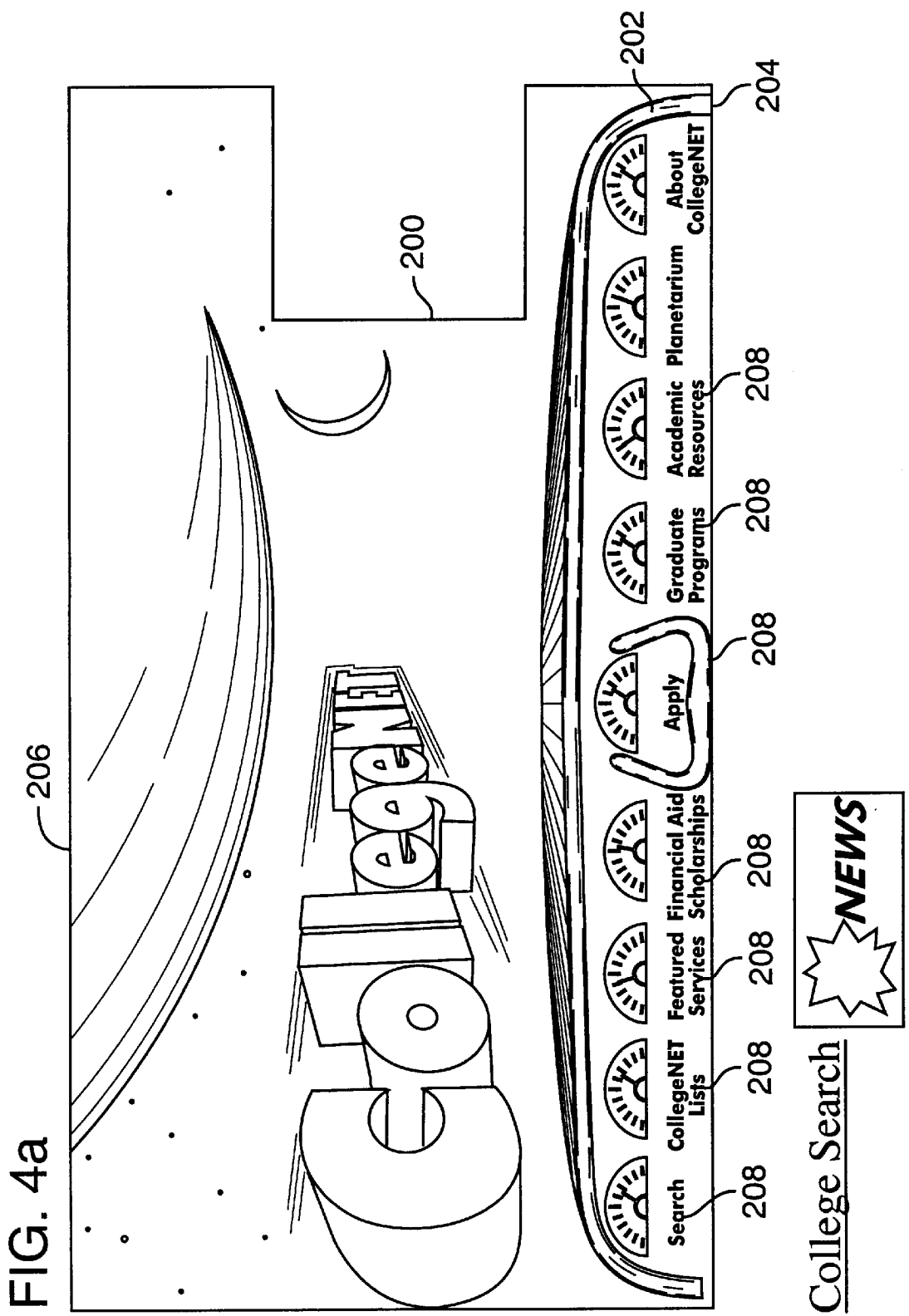

FIG. 4a shows a screen display 200 of a view looking out over a cockpit display or dashboard 202 of a spacecraft 204 approaching a planet 206. Dashboard 202 includes user-selectable options 208 displayed as dashboard instruments. Selecting one of selectable options 208 causes the system to descend into the next lower level of the informational hierarchy. For example, if the option labeled "Search" is selected, the system displays a screen display 220 (FIG. 4b) comprising a first clickable actuator 222 and a second clickable actuator 224.

Actuator 222 shows spacecraft 202 approaching a destination. When the first actuator 222 is selected, the user will return to screen display 200 at the top level of the hierarchy. The second actuator 224 represents the current level and includes the word "Search" to indicate to the user that the current level is the "Search" level. Spacecraft 202 in second actuator 224 has not yet landed but is closer to the ground than spacecraft 202 shown in first actuator 222. The proximity of spacecraft 202 to landing at its destination indicates graphically to the user that he has descended in the hierarchy, but has not yet reached the sought-after data. Screen display 220 also includes user-selectable options 226 for descending into the next hierarchical level. Options 226 include "Search the CollegeNET Database of Four Year College," "Find Four Year Schools by State with the CollegeNET Map," "Community, Technical, and Junior Colleges plus other options," and "Search for schools in Canada, New Zealand, and Australia." Clickable actuators 222 and 224 display background mountain ranges 228, which join together to form a unitary image.

Figure 4B:
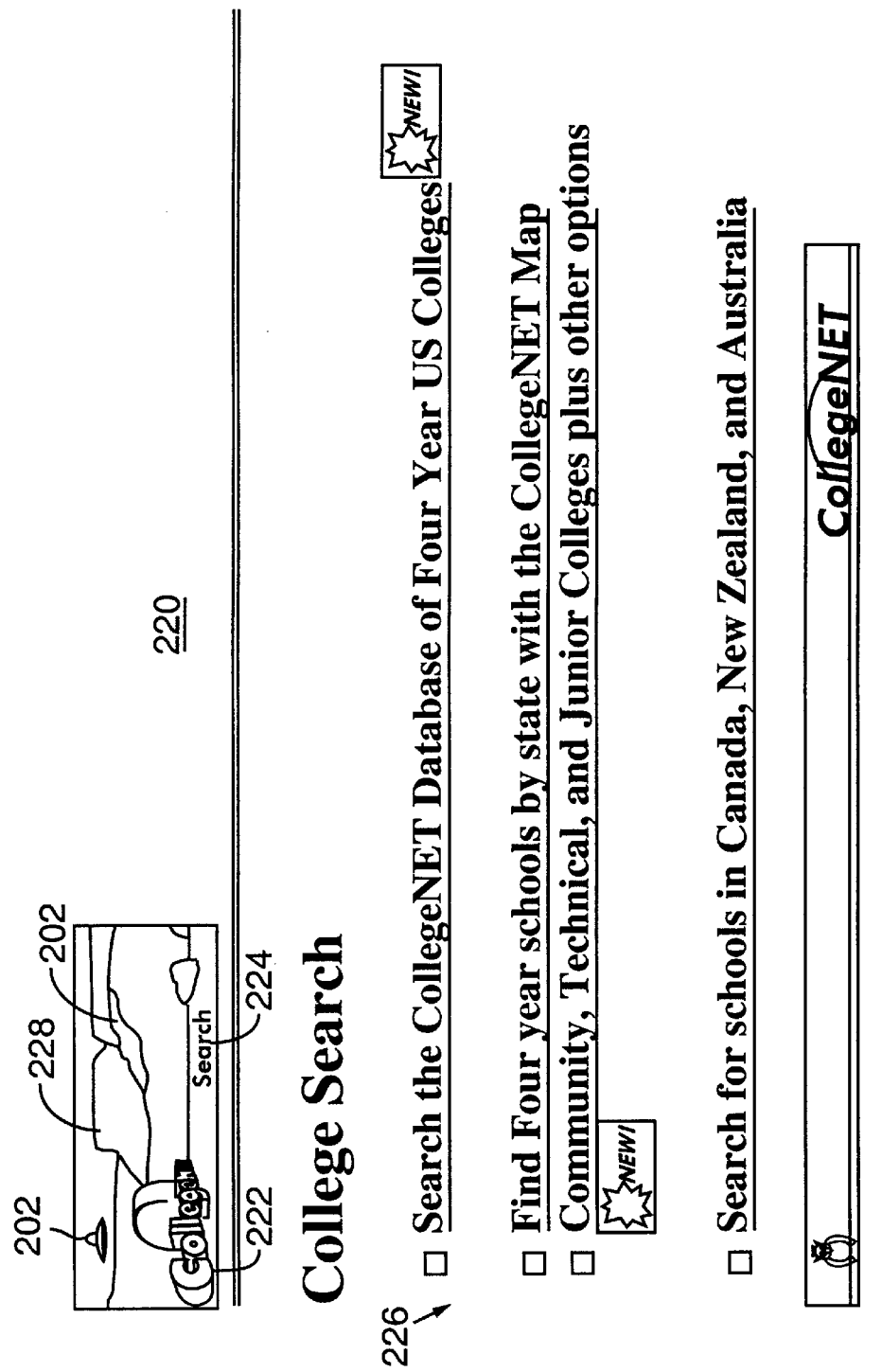

FIG. 4c shows an image 230 displayed when a user selects "Search the CollegeNET Database of Four Year College" option from screen display 220 shown in FIG. 4b. Image 230 shows three clickable actuators. Clickable actuators 222 and 224 are the same as those presented screen display 220 in FIG. 4b at the previous hierarchical level. They show the user the path from the top level to the present position and provide an intuitively understandable means to return to the previous levels. Rightmost clickable actuator 232, which includes the words "Search Engine," indicates the user's present location in the information hierarchy. Below actuators 222, 224, and 232, image 230 presents fields 234 in which the user can enter search criteria to be used by the search engine. Spacecraft 202 is shown nearer to the ground in clickable actuator 232 than in clickable actuators 222 and 224 to indicate that the user is nearer to his sought-after information. The background mountain range 228 of clickable actuator 232 combines with the background mountain ranges 228 of clickable actuators 222 and 224 to form a unitary image of a mountainous region. After the user enters search criteria and the search engine searches a database to find records matching the user's criteria, the search results are displayed as shown in FIG. 4d.

Figure 4D:
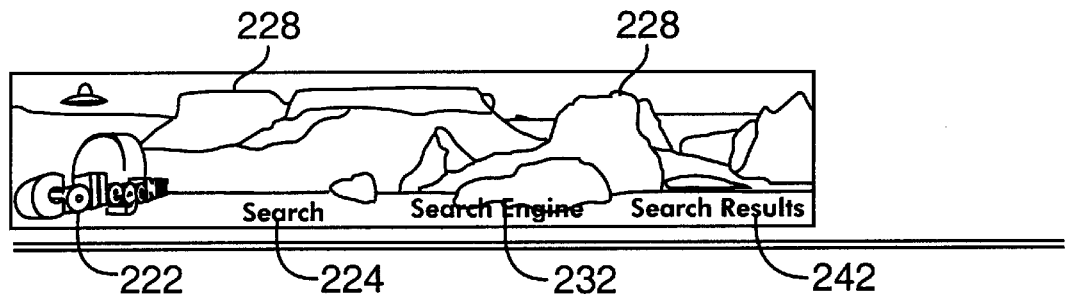
Figure 4D:

FIG. 4d shows a screen display 240 that includes clickable actuators 222, 224, and 232, which show in descending order, levels between the top level and the current level through which the user has passed to arrive at the present position. Actuators 222, 224, and 232 also provide the user with intuitively understandable controls for returning to any of the previous levels. Screen display 240 also includes a clickable actuator 242 that indicates the present position in the informational hierarchy. Clickable actuator 242 shows the spacecraft as having landed, which corresponds to the user having arrived at the information he requested. Below clickable actuators 222, 224, 232, and 242 is a summary 244 of the search criteria and a list 246 of colleges that meet the search criteria. List 246 can include links to Internet sites of the schools in the list or can be used to access additional information about a particular school.

Figure 5:
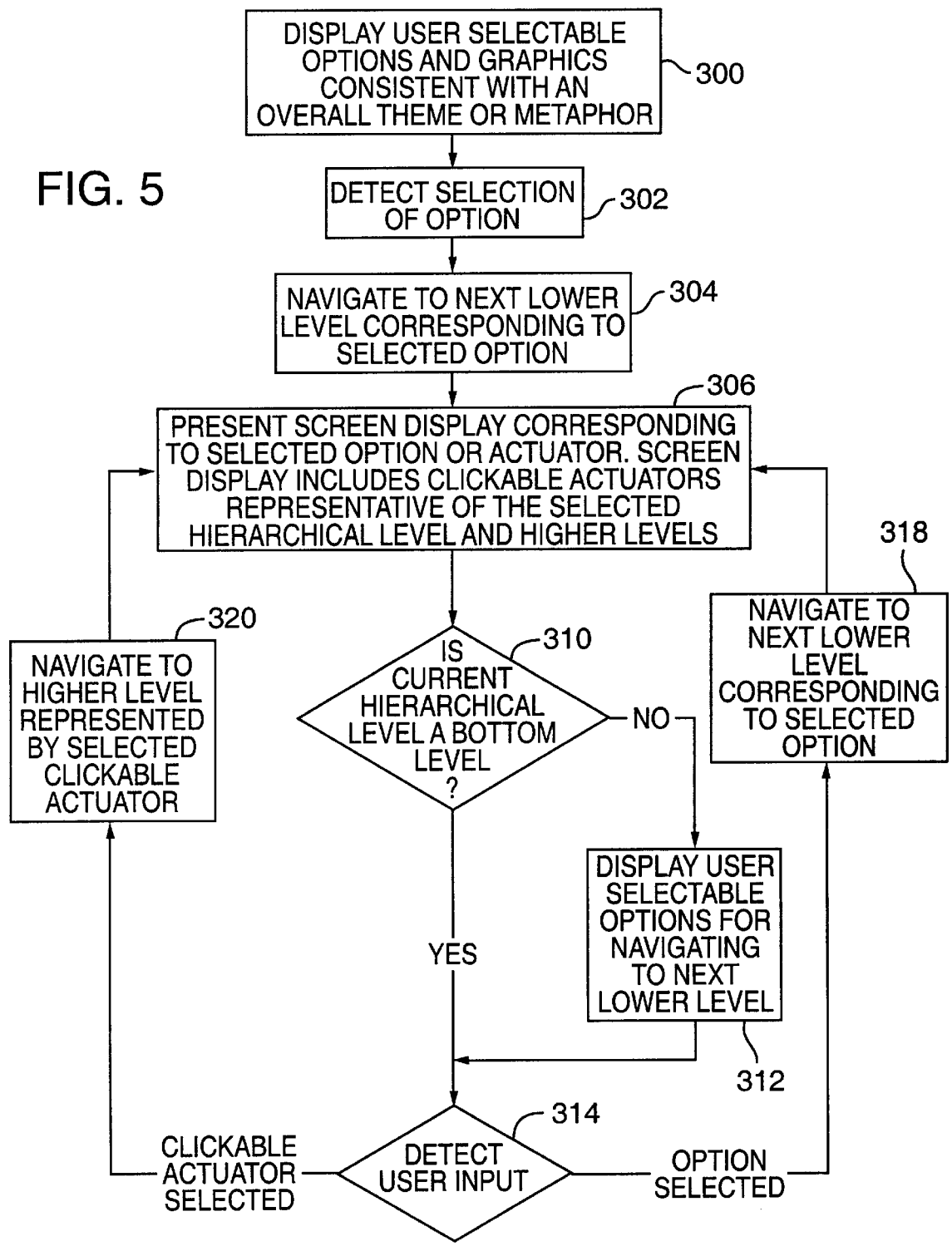
FIG. 5 is a flowchart showing generalized steps of a preferred embodiment of the present invention.

FIG. 5 is a flowchart showing the steps of facilitating a user's navigation through a hierarchy of computer-presented screen displays in accordance with a preferred embodiment of the present invention. Step 300 entails displaying a list of user-selectable options and graphics consistent with an overall theme or metaphor of the subject matter. For example, FIGS. 2a and 3a show, respectively, graphics corresponding to the horse theme and to the space metaphor of higher education. The user-selectable options are shown in the labeled fence rails of FIG. 2a and in the dashboard instruments of FIG. 4a. In step 302, the system detects the selection of one of the displayed options. The system could detect the selection by detecting a mouse button click when a cursor is positioned over an option, an "enter" keystroke when the option is highlighted, or a touch on a screen at the location of the option. Procedures for selecting an option from a computer screen are well known in the art. Step 304 shows that the user navigates to the next lower level corresponding to the selected option.

Step 306 shows that the system displays a screen display presenting information corresponding to the selected option. Step 306 also shows that it can be preceded by the selection of a clickable actuator, which would also cause the system to navigate to a corresponding screen display. Selecting an option typically navigates to a lower level in the information hierarchy, whereas selecting a clickable actuator typically navigates to a higher level, although an option can return the user to a higher level. The information presented in the screen display includes clickable actuators representative of the current level and of higher levels through which the user navigated to arrive at the current level. The clickable actuators form a unitary image consistent with the overall theme or metaphor, such as fence 106 and rustic shake wall 126 of FIGS. 2a–2d or the mountainous background scenery and spacecraft 202 of FIGS. 4a–4d. Step 310 shows that if the current level is not a bottom level, the system will display in step 312 user-selectable options for navigating to a next lower level.

Step 314 shows that the system next detects additional user input. If the user is not at a bottom level and selects an option, step 318 indicates that the user will navigate to the selected next lower level and the information will be displayed in accordance with step 306. If the user selects one of the clickable actuators that represent the path taken to the current level, step 320 shows that the system will navigate to the level represented by the selected actuator. The user can continue to navigate up and down the hierarchy in accordance with FIG. 5 until he leaves the system.

It will be obvious to those having skill in the art that many changes may be made to the details of the above-described embodiments of this invention without departing from the underlying principles thereof. For example, the clickable actuators could be selected by means other than clicking a mouse button, such as touching a touch screen or depressing the enter key. The themes and metaphors will be different for different types of information.

Although the examples provided show the invention use for navigating in a database, the invention is useful in navigating through any computer-presented information. For example, the invention could be used for a computer-implemented process for controlling machinery or for applying for admission to a college.

The scope of the present invention should, therefore, be determined only by the following claims.

I claim:

1. A computer-implemented method for facilitating navigation by a user through a hierarchy of computer-presented information, the method comprising:

a. presenting on a computer screen information associated with one navigational level and a clickable actuator that is representative of the one navigational level, thematically or metaphorically representative of the topic of information being navigated, and that is selectable by the user to return to the one navigational level; and b. presenting in response to a user selection of information presented at the one navigational level:

i. a screen display of information representative of a subsequent navigational level;

ii. the clickable actuator representative of the one navigational level; and iii. a second clickable actuator representative of the subsequent navigational level, having pictorial subject matter in common with the first actuator, and being thematically or metaphorically consistent with the topic of information being navigated, the presentation of the first and second clickable actuators at the subsequent navigational level being juxtaposed to provide the user a thematic or metaphoric reference to the topic of information being navigated and to provide information identifying the user's current position in the information hierarchy, path information concerning a route to the present place in the hierarchy, and a clickable means to return to any location previously traversed in the hierarchy.

2. The method of claim 1 further comprising a third clickable actuator representative of a third navigational level, having pictorial subject matter in common with the first and second actuators, and being consistent in theme or metaphor with the topic of information being navigated.

3. A computer-implemented method for facilitating navigation by a user through a hierarchy of computer-presented information related to a subject matter, the method comprising:

presenting on a computer screen a series of at least two juxtaposed clickable actuators, each clickable actuator being representative of a different hierarchical level of the computer-presented information and including common pictorial subject matter consistent with an overall theme or metaphor representative of the subject matter, so that the series of juxtaposed clickable actuators forms a unitary image pictorially consistent with the overall theme or metaphor, the series of clickable actuators assisting the user's navigation of the hierarchy of computer-presented information by providing the user with a consistent pictorial reference to the subject matter of the computer-presented information, an intuitively understandable display of the user's position within the hierarchy and the path taken through the hierarchy to arrive at that position, and an intuitive means to return to any position along the path; and sensing the user selection of one of the series of clickable actuators and navigating to the hierarchical level represented by that actuator.

4. The method of claim 3 in which a first one of the clickable actuators represents an ith level in the hierarchy of information and a second one of the clickable actuators represents a i+1th level in the hierarchy of information and in which presenting on a computer screen at least two juxtaposed clickable actuators includes modifying the appearance of the ith clickable actuators to conform to the image of the i+1th clickable actuator.

5. The method of claim 3 in which the clickable actuators in the series depict differing levels of completion of a process, with one of the series of clickable actuators showing the process completed when the user reaches a bottom level of the hierarchy of computer-presented information.

6. The method of claim 3 in which presenting on a computer screen at least two clickable actuators includes presenting three clickable actuators.

7. A mnemonic device for navigating through a hierarchy of computer-presented information, comprising:

a set of juxtaposed clickable actuators corresponding to steps in an interactive computer-implemented process and forming a coherent image thematic or metaphoric with the process, each clickable actuator representative of a different level of the hierarchy and including pictorial subject matter common to the other clickable actuators in the set, the common subject matter thematically or metaphorically consistent with the process, the set of actuators providing the user with a consistent reference to the subject matter of the computer-presented information and with information identifying his position within the hierarchy and the path taken to arrive at that position, as well as a means to return to any position along the path.

8. The method of claim 7 in which the set of clickable actuators includes at least three actuators.

9. The method of claim 7 in which the set of clickable actuators depicts stages in a process, the depictions showing the process approaching completion as the user approaches lower levels in the informational hierarchy.

10. A method of presenting multilevel hierarchical information to a computer user so as to facilitate the user's navigation through the multiple levels of the information by the use of clickable actuators, comprising:

a. presenting to the user at one level within the hierarchy one group of multiple user-selectable selections;

b. in response to a user selection of one of the group of multiple user-selectable selections at the one level, navigating to a subsequent level of the hierarchical information indicated by the user's selection and presenting:

i. a second group of user-selectable selections;

ii. a first clickable actuator representative of the one level; and iii. a second clickable actuator representative of the subsequent level, the clickable actuators being operable to navigate to the represented levels, including a thread of common subject matter consistent with an overarching theme or metaphor that is consistent with the overall content of the computer-presented information, and being juxtaposed to form a unitary image pictorially consistent with the overarching theme or metaphor and with each other, the clickable actuators providing the user with a consistent reference to the subject matter of the computer-presented information and information identifying his position within the hierarchy and the path taken to arrive at that position, as well as a means to return to any position along the path.

11. The method of claim 10 in which the appearance of the first clickable actuator is modified to conform to the second clickable actuator when the second clickable actuator is juxtaposed to form a continuous single image.

12. The method of claim 10 in which the first clickable actuator represents an intermediate level within the multilevel hierarchy of information.

13. The method of claim 10 in which the unitary image comprises related, individually complete images.

14. The method of claim 13 in which the individually complete images depict a process in varying phases of completion.

15. An apparatus for presenting to a user multi-level hierarchical information and for facilitating the user's navigation through the multiple levels of the information stored on a digital computer, comprising:

a computer display terminal;

means for presenting to the user on the computer display terminal at one level of the hierarchy a first group of multiple user-selectable options;

means for responding to a user selection of one of the group of multiple options at the one level, for navigating to another level of the hierarchical information indicated by the user's selection and for presenting a group of user-selectable actuators including a first actuator representative of the one level, and a second actuator representative of the other level, the clickable actuators being operable to navigate to the represented levels, including a thread of common subject matter consistent with the overarching theme or metaphor, and being juxtaposed to form a unitary image pictorially consistent with the overarching theme or metaphor and with each other to provide a consistent reference to the user of the subject matter of the information being referenced and to identify the user's position within the hierarchy and the path used to arrive at that position and a means to return to any position along the path.

16. The method of claim 1 in which the clickable actuators depict a process in differing levels of completion, the process being thematically or metaphorically related to the hierarchy of information.

17. The method of claim 16 in which the second clickable actuator represents a bottom level of the hierarchy of information and depicts the completion of a process.

18. The method of claim 16 in which the displayed information at each navigational level is representative of steps in an interactive computer process.

19. A method of presenting multilevel hierarchical information to a computer user so as to facilitate the user's navigation through the multiple levels of the information by the use of clickable actuators, the ith level representing a typical level of the hierarchy, the method comprising:

a. presenting to the user at the level an ith group of multiple user-selectable selections;

b. in response to a user selection of one of the group of multiple selections at the ith level, navigating to an i+1th level of the hierarchical information indicated by the user's selection and presenting:
  i. an i+1th group of user-selectable selections;
  ii. an ith first clickable actuator representative of the ith level; and
  iii. an i+1th clickable actuator representative of the i+1th level, the clickable actuators being operable to navigate to the represented levels, including a thread of common subject matter consistent with an overarching theme or metaphor that is consistent with the overall content of the computer-presented information, and being juxtaposed to form a unitary image pictorially consistent with the overarching theme or metaphor and with each other, the clickable actuators providing the user with a consistent reference to the subject matter of the computer-presented information and information identifying his position within the hierarchy and the path taken to arrive at that position, as well as a means to return to any position along the path.

* * * * *